(12) United States Patent
Denkin et al.

(10) Patent No.: US 6,253,330 B1
(45) Date of Patent: Jun. 26, 2001

(54) REDUNDANT REGULATED POWER SUPPLY SYSTEM WITH MONITORING OF THE BACKUP POWER SUPPLY

(75) Inventors: Nathan M. Denkin, Aberdeen; Alexander Golubchik, Eatontown; Bharat P. Sinha, East Brunswick, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/251,842

(22) Filed: Feb. 17, 1999

(51) Int. Cl.[7] ............................................. G06F 1/26
(52) U.S. Cl. ...................... 713/300; 713/340; 307/52; 323/280; 323/281
(58) Field of Search ............................ 713/300, 340; 307/52; 323/229, 265, 280, 281, 293, 298; 365/226; 364/492

(56) References Cited

U.S. PATENT DOCUMENTS 5,914,606 * 6/1999 Becker-Irvin ........................ 324/434

* cited by examiner

*Primary Examiner*—Ario Etienne

(57) ABSTRACT

The monitoring of regulated redundant power supplies is enhanced by returning to each power supply a feedback (sensed) voltage signal that is indicative of the voltage level that the respective power supply is outputting and the voltage level supplied to a system load. In one embodiment, a feedback signal that is supplied to a power supply as the sensed signal is derived using a voltage divider network across the output of the power supply and a common connection at which the outputs of the power supplies are "Ored" for delivery to the system load. In this way, each power supply regulates its output voltage as a function of the level of the feedback signal and the level of a respective preset signal.

15 Claims, 2 Drawing Sheets

REDUNDANT REGULATED POWER SUPPLY SYSTEM WITH MONITORING OF THE BACKUP POWER SUPPLY

FIELD OF THE INVENTION

The invention relates to redundant power supply systems and more particularly relates to monitoring concurrently the active and backup power supplies.

BACKGROUND OF THE INVENTION

Critical circuits within a complex electronic system require a highly reliable source of regulated power. Such systems typically employ several power supplies, active and backup power supplies, to provide the required reliability. A conventional method of combining redundant power supplies uses diodes to "Or" the outputs of the power supplies. To regulate the level of the voltage that is being supplied to the drain (load), the voltage at the drain is sensed and fed back to each of the redundant power supplies. As will be explained below in detail, each such power supply compares the value of the sensed signal with the value of a respective preset signal and changes its output as a function of the difference between the sensed and preset signal. Such regulation may have the effect of causing the output voltage level of one of the power supplies (typically the backup power supply) to decrease significantly, while the other power supply outputs an acceptable voltage level. Apparatus that monitors the backup power supply would thus be unable to determine if that power supply is operating properly, and, more likely, would incorrectly conclude that the backup supply has failed.

SUMMARY OF THE INVENTION

We have recognized that the foregoing problem may be dealt with, in accordance with an aspect of the invention, by using as the sense signal a feedback signal that is derived as a function of both the voltage signal outputted by a power supply and the voltage signal (sensed signal) delivered to the load. Accordingly, then, the regulation of the outputted voltage signal is based on both the outputted voltage signal and sensed voltage signal. More specifically, in accordance with various aspects of the invention, a feedback signal that is supplied to a power supply as the sensed signal is derived using a voltage divider network across the output of the power supply and a common connection at which the sensed voltage is derived. A power supply then regulates its output voltage as a function of the level of the feedback signal and the level of the preset signal.

These and other aspects of the invention will become more apparent from the following detailed description read in conjunction with the accompanying drawings.

DETAILED DESCRIPTION

Figure 1:
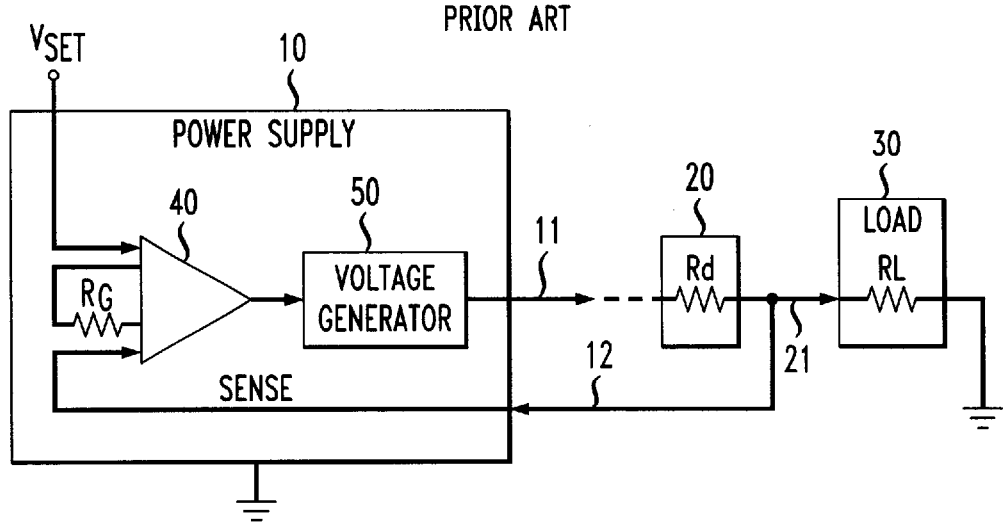
FIG. 1 is broad block diagram of a conventional regulated power supply.

The prior art system illustrated in FIG. 1 includes power supply 10 and load 30 represented by resistor RL. Power supply 10 outputs to path 11 a voltage level derived as a function of an externally supplied preset voltage level, $V_{set}$, which may be established via one of a number of different conventional ways, e.g., programming, zener diode, precision bridge, etc. Path 11 may include distributed resistance (represented in the FIG. by resistor 20 also designated Rd) which decrease the level of the voltage that supply 10 provides to load 30. The actual level of the voltage that is supplied to load 30 is sensed in a conventional way and fed via path 12 to one input of instrumentation amplifier 40, whose gain is set by the value of resistor Rg. Amplifier 40 compares the sensed voltage level with the preset voltage level, $V_{set}$, that is supplied to another input of amplifier 40. Amplifier 40 then outputs to voltage generator 50 an error signal that is indicative of the difference between the level of the sensed voltage and preset voltage. Voltage generator 50, in a conventional manner, changes the level of the voltage signal that it is supplying to path 11 with respect to ground. For example, if the sensed voltage is lower (higher) than the preset voltage, then generator 50 increases (decreases) the level of the voltage signal that it is outputting to path 11. An equilibrium is reached when the level of the sensed voltage equals the level of the preset voltage, $V_{set}$.

Figure 2:
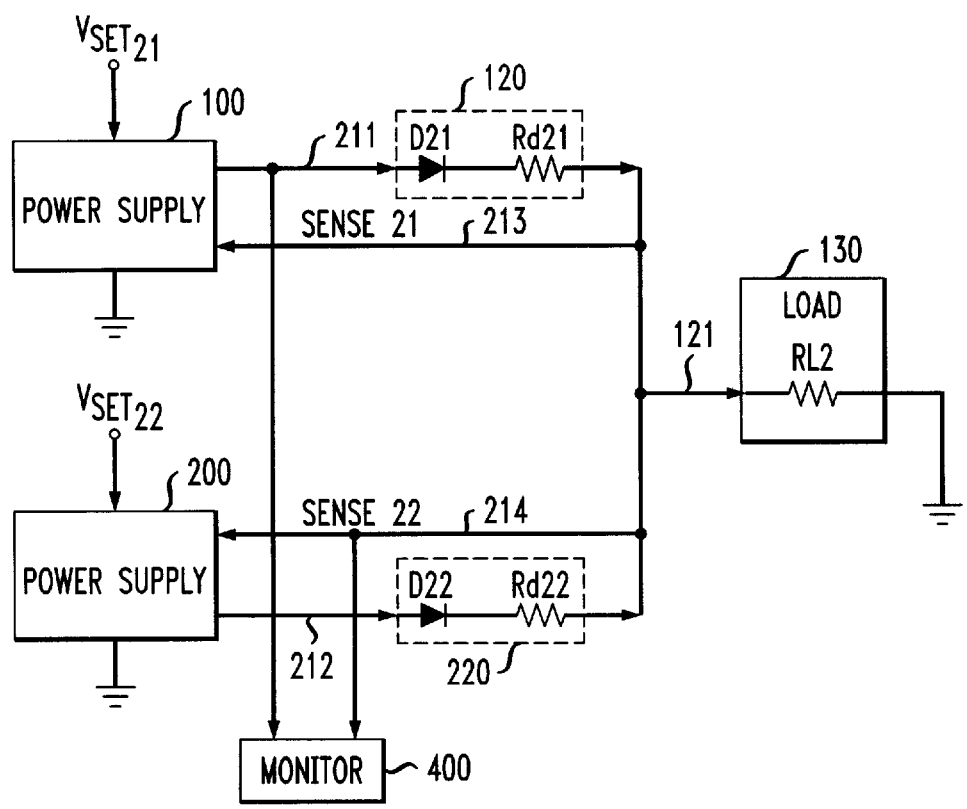
FIG. 2 is broad block diagram of a redundant power supply system regulated in the manner shown in FIG. 1.

This voltage regulation scheme may be applied in a conventional manner to a system having redundant power supplies, as shown in FIG. 2, in which each of the power supplies 100 and 200 are similar to power supply 10 of FIG. 1. Also, voltage supply paths 211 and 212 extending to load 130 (represented by RL2) may similarly include some distributed resistance respectively represented by resistors Rd21 and Rd22. Diodes D21 and D22 provide an Or function as well as isolating power supplies 100 and 200 from one another. The level of voltage supplied to load 130 via path 121 with respect to ground is sensed by sense paths 213 and 214 respectively connected to supplies 100 and 200 in the manner shown in FIG. 1. As discussed above, power supply 100 adjusts the level of the voltage that it is outputting across path 211 and ground as a function of the difference between the levels of the sensed voltage level supplied via path 21 (sense21) and preset voltage $Vset_{21}$. Power supply 200 operates similarly with respect to the sensed voltage level supplied via path 214 (sense22) and preset voltage $Vset_{22}$.

We have recognized that a problem arises when the values of the preset voltages, $Vset_{21}$ and $Vset_{22}$ have approximately the same nominal value, but do not actually equal one another. Specifically, the power supply connected to the higher preset voltage level continues to increase the level of the voltage signal that it is supplying to load 130 until the level of the voltage at path 121 equals the higher preset voltage level. The power supply that is connected to the lower preset voltage level, on the other hand, continues to decrease the level of the voltage signal that it is supplying to load 130 as a way of attempting to match its preset voltage level with the voltage level supplied via sense path 214. For example, assume that preset voltage $Vset_{21}$ equals +5.3 volts and preset voltage $Vset_{22}$ equals +5.2 volts. Although the preset voltage levels nominally equal one another and are within a specified limit, power supply 100 will, nevertheless, increase its output to a point where the voltage supplied to load 130 equals +5.3. Power supply 200 "seeing" that the sensed voltage of +5.3 volts is greater than its preset voltage of +5.2 volts decreases the level of its output voltage to drive the voltage that is being supplied to load 130 toward a value of +5.2 volts. Each time power supply 200 decreases the level of its output voltage the difference between the sensed voltage level and $Vset_{22}$ increases. Disadvantageously, power supply 200 continues to operate in this manner until the level of the voltage signal that it is outputting effectively reaches zero. At that point, monitor 400 may conclude that power supply 200 is not operating properly and may output an alarm message indicating that the power supply failed. A craftsperson responding to the message may then replace the supposedly failed power supply 200.

Figure 3:
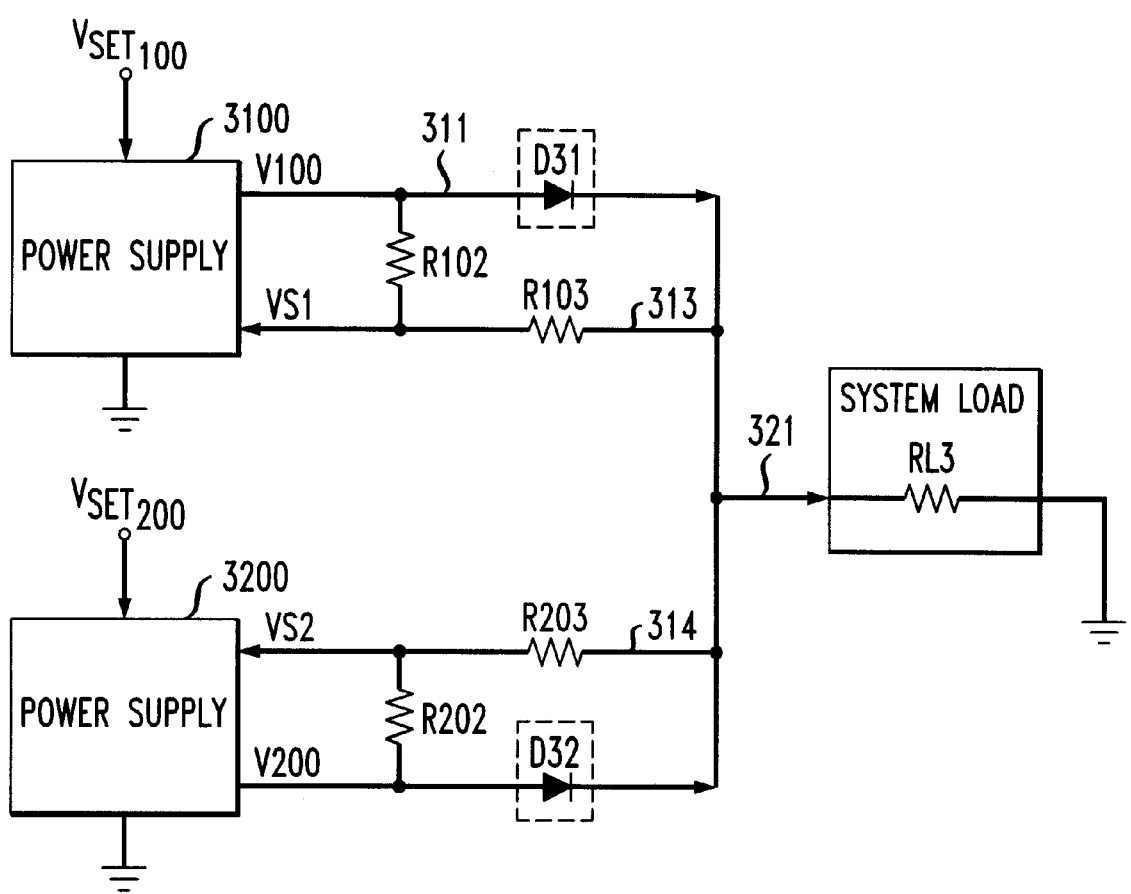
FIG. 3 is broad block diagram of redundant power supply system regulated in accordance with the principles of the invention.

We have further recognized that the foregoing problem may be dealt with by forcing both power supplies to operate as expected. We do this, in accordance with an aspect of the invention, by "tailoring" the sensed voltage level that is supplied to a power supply to the preset voltage level that is connected to that power supply. Such tailoring may be achieved, in accordance with another aspect of the invention, by sensing the voltage level at the load and at the output of a power supply using, for example, a voltage divider across a respective "Oring" diode as is shown in FIG. 3. In this way, a voltage level with respect to ground will appear at the junction of resistors R102 and R103 (R202 and R203) between the voltage level at 311 (312) and the voltage level at 321. In effect, the difference between the voltage level at 311 (312) and voltage level at 321 will be the voltage drop across diode D31 (D32). In an illustrative embodiment of the invention, diodes D31 and D32 are Shottky diodes having a voltage drop in the range of, for example, 0.2 volts. Thus, the sensed voltage is a value that is weighted in accordance with the values of the resistors forming the voltage divider, which, in accordance with an illustrative embodiment of the invention, equal one another and each may have a value of, e.g., 100,000 ohms.

With reference to FIG. 3, the sensed voltage, Vs1, supplied to supply 3100 may be expressed as follows:

$$Vs1 = \frac{(R103 * V100 + R102 * Vout)}{R102 + R103} \quad (1)$$

where V100 is the output voltage at power supply 3100 and Vout is the voltage level at 321. The sensed voltage supplied to power supply 3200 may be similarly expressed as follows:

$$Vs2 = \frac{(R203 * V200 + R202 * Vout)}{R202 + R203} \quad (2)$$

where V200 is the output voltage at power supply 3200 and, as mentioned above, Vout is the voltage level at 321.

Based on the foregoing, power supplies 3100 and 3200 may now independently adjust their respective output voltages, V100 and V200, such that the sensed voltages supplied to those power may be adjusted to equal the respective preset voltage level, as will be shown below. Thus, assume that the level of $Vset_{100}$ is greater than the level of $Vset_{200}$. For that case we may express $Vset_{31}$ as follows:

$$Vset_{100} = \frac{(R103 * V100 + R102 * Vout)}{R102 + R103} \quad (3)$$

Solving for Vout yields the following expression:

$$Vout = \frac{(R103(Vset_{100} - v100)}{R102} + Vset_{100} \quad (4)$$

In general, Vout and V100 differ by an amount related to the voltage drop through Oring diode D31, which may be, for example, a Shottky diode. As is well known, the voltage drop, δ(I) across a Shottky diode is approximately 200 mv.

If we letting V100=δ(I)+Vout, then the equation for Vout may be re-written as follows:

$$Vout = Vset_{100} - \frac{\delta(I) * R103}{R102 + R103} \quad (5)$$

It is noted that $V_{out}$ will be somewhat less than the setpoint $V_{set100}$. For the case where R102=R103, the difference should be approximately 100 mv. Increasing the resistance of R102 will minimize this difference.

The output voltage V200 in terms of V100 may be determined starting with the following expression:

$$\frac{(R102 + R103) * Vset_{100} - R102 * V100}{R102} = \quad (6)$$
$$\frac{(R202 + R203) * Vset_{200} - R202 * V200}{R202}$$

If the values of all of the resistors are equal, then (6) may be expressed as follows:

$$2*Vset_{100}-V100=2*Vset_{200}-V200 \quad (7)$$

If $Vset_{100}=Vset_{200}+\Delta$, then V200 in (7) may be expressed as follows:

$$V200=V100-2*\Delta \quad (8)$$

Thus, as shown by equation (8), when the monitor of FIG. 2 observes the outputs of power supplies 3100 and 3200 it will find that the voltage level V200 will be slightly less than voltage level V100—differing by merely the twice the difference between the setpoints—, thereby confirming that power supply 3200 is operating properly, all in accordance with an aspect of the invention.

It will thus be appreciated that, although the invention illustrated herein is described in the context of a specific illustrative embodiment, those skilled in the art will be able to devise numerous alternative arrangement which, although, not explicitly shown or described herein, nevertheless, embody the principles of the invention and are within its spirit and scope.

We claim:

1. Apparatus comprising
    a plurality of power supplies each generating an output voltage signal that is supplied to a system load common to the power supplies;
    a plurality of isolating devices having one terminal connected to the output of a respective one of the power supplies and having another terminal connected to a connection point extending to the system load to isolate the outputs of the power supplies from one another; and
    a plurality of signal sensing paths connected at one end to a first input of a respective one of the power supplies and connected at the other end to the connection point to provide a feedback signal derived as a function of a voltage signal supplied to the system load and a voltage signal outputted by the respective one of the power supplies, and wherein each of the power supplies includes signal regulation apparatus that changes the level of the voltage signal that the power supply outputs as a function of the level of the feedback signal that the power supply receives via its respective signal sensing path and level of a preset signal connected to a respective second input.

2. The apparatus of claim 1 wherein the isolating devices are diodes.

3. The apparatus of claim 2 wherein the diodes are Shottky diodes.

4. Apparatus comprising
- a plurality of power supplies each generating an output voltage signal that is supplied to a system load common to the power supplies;
- a plurality of isolating devices having one terminal connected to the output of a respective one of the power supplies and having another terminal connected to a connection point extending to the system load to isolate the outputs of the power supplies from one another; and
- a plurality of signal sensing paths connected at one end to a first input of a respective one of the power supplies and connected at the other end to the connection point to provide a feedback signal derived as a function of a signal developed across a respective one of the isolating devices and wherein each of the power supplies includes signal regulation apparatus that changes the level of the voltage signal that the power supply outputs as function of the level of the feedback signal that the power supply receives via its respective signal sensing path and level of a preset signal connected to a respective second input, said apparatus further comprising a plurality of voltage divider networks connected across respective ones of the isolating devices such that a respective feedback signal is supplied from a center tap of a respective one of the divider networks.

5. The apparatus of claim 4 wherein each voltage divider network is formed from two resistors of respective resistive values.

6. The apparatus of claim 4 wherein the two resistors have the same value.

7. The apparatus of claim 4 further comprising monitoring apparatus that monitors the output of each of the power supplies.

8. The apparatus of claim 4 wherein the plurality of power supplies is formed from two power supplies.

9. A power supply system comprising
- first and second regulated power supplies each outputting a regulated voltage level to a system load via respective isolating devices commonly connected to the system load;
- first and second voltage divider networks connected across respective ones of the isolating devices such that each of the first and second divider networks supplies a feedback signal to an input of a respective one of the first and second regulated power supplies, and wherein the feedback signal is formed as a function of the level of the regulated voltage level outputted by the respective one of the first and second power supplies and a voltage level appearing at the common connection; and
- first and second regulation apparatus that changes, as a function of the level of the feedback signal and level of a respective preset voltage, the level of the regulated voltage outputted by said respective one of the first and second power supplies.

10. The system of claim 9 wherein the isolating devices are diodes.

11. The system of claim 10 wherein the diodes are Shottky diodes.

12. A power supply system comprising
- first and second regulated power supplies each outputting a regulated voltage level to a system load via respective isolating devices commonly connected to the system load;
- first and second voltage divider networks connected across respective ones of the isolating devices such that each of the first and second divider networks supplies a feedback signal to an input of a respective one of the first and second regulated power supplies and wherein the feedback signal is formed as a function of the level of the regulated voltage level outputted by the respective one of the first and second power supplies and a voltage level appearing at the common connection; and
- first and second regulation apparatus that changes, as a function of the level of the feedback signal and level of a respective preset voltage, the level of the regulated voltage outputted by said respective one of the first and second power supplies, wherein the respective feedback signal is supplied from a center tap of a respective one of the divider networks.

13. The system of claim 12 wherein each voltage divider network is formed from two resistors of respective resistive values.

14. The system of claim 13 wherein the two resistors have the same value.

15. The system of claim 12 further comprising monitoring apparatus that monitors the output of each of the first and second power supplies.

* * * * *